(12) United States Patent
Hinohara et al.

(10) Patent No.: US 8,190,795 B2
(45) Date of Patent: May 29, 2012

(54) MEMORY BUFFER ALLOCATION DEVICE AND COMPUTER READABLE MEDIUM HAVING STORED THEREON MEMORY BUFFER ALLOCATION PROGRAM

(75) Inventors: Hisashi Hinohara, Kawasaki (JP); Shigenobu Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 82 days.

(21) Appl. No.: 12/414,663

(22) Filed: Mar. 31, 2009

(65) Prior Publication Data

US 2009/0248922 A1   Oct. 1, 2009

(30) Foreign Application Priority Data

Mar. 31, 2008   (JP) ................................ 2008-089221

(51) Int. Cl.
*G06F 12/00* (2006.01)
(52) U.S. Cl. .................. 710/56; 711/147; 718/104
(58) Field of Classification Search .................. None
See application file for complete search history.

(56) References Cited

U.S. PATENT DOCUMENTS 6,542,926 B2 *   4/2003   Zalewski et al. .............. 709/213
7,065,630 B1 *   6/2006   Ledebohm et al. ........... 711/206
7,624,240 B1 * 11/2009   Colbert et al. ................ 711/159

FOREIGN PATENT DOCUMENTS

| JP | 08-147218 | 6/1996 |
|----|-----------|--------|
| JP | 2004-178571 | 6/2004 |
| JP | 2007-200346 A | 8/2007 |
| JP | 2007-299423 | 11/2007 |

OTHER PUBLICATIONS

Japanese Office Action mailed Mar. 27, 2012 for corresponding Japanese Application No. 2008-089221, with English-language translation.

* cited by examiner

*Primary Examiner* — Cheng-Yuan Tseng
(74) *Attorney, Agent, or Firm* — Fujitsu Patent Center

(57) ABSTRACT

A memory buffer allocation device for allocating a memory buffer in a virtual computer system in which a plurality of virtual operating systems operate in time-sharing on one CPU having the memory buffer, includes a memory buffer division unit which divides the memory buffer into a number (n) of areas and reserves a division unit number (m) of areas out of the n areas as a dedicated memory buffer and the other areas except for the number n of the areas as a shared memory buffer. The device also includes a memory buffer allocation unit which allocates each area of the dedicated memory buffer to a number m of domains and each area of the shared memory buffer to other n-m domains except for the number m of domains, wherein the domains are of the virtual operating systems that are operating in the virtual computer system.

6 Claims, 11 Drawing Sheets

| | |
|---|---|
| DOMAIN DISPATCH INTERVAL | 10[ms] |
| NUMBER OF DOMAINS | 4 |
| MEMORY BUFFER SIZE | 12[MB] |
| PROCESSOR FACTOR | 1 |
| LOWEST MEMORY BUFFER SIZE | 1[MB] |
| MEMORY BUFFER SIZE SETTING COUNTER | 10 |

FIG.10A

| | |
|---|---|
| MEMORY BUFFER DIVISION NUMBER | 3 |
| MEMORY CORRECTION FACTOR | 0.3 |
| I/O CORRECTION FACTOR | 1 |
| INCREASE OR DECREASE VALUE | ±10[%] |

FIG.10B

| | DEDICATED MEMORY BUFFER#1 | DEDICATED MEMORY BUFFER#2 | SHARD MEMORY BUFFER |
|---|---|---|---|
| STARTING POINT | DOMAIN#a | DOMAIN#b | OTHER |
| | 4[MB] | 4[MB] | 4[MB] |
| DATA COLLECTION No.1 | DOMAIN#c | DOMAIN#b | OTHER |
| | 4[MB] | 4[MB] | 4[MB] |
| ⋮ | ⋮ | ⋮ | ⋮ |
| DATA COLLECTION No.10 | DOMAIN#c | DOMAIN#b | OTHER |
| | 4[MB] | 4[MB] | 4[MB] |
| MEMORY BUFFER RESIZE | DOMAIN#c | DOMAIN#b | OTHER |
| | 2[MB] | 6[MB] | 4[MB] |

FIG.10C

| | DOMAIN #a | | | DOMAIN #b | | |
|---|---|---|---|---|---|---|
| | CPU Busy | Memory Size | I/O Count | CPU Busy | Memory Size | I/O Count |
| STARTING POINT | 40 | 1000 | 300 | 30 | 5000 | 1200 |
| DATA COLLECTION No.1 | 10 | 1000 | 300 | 30 | 5000 | 1200 |
| ...... | ...... | ...... | ...... | ...... | ...... | ...... |
| DATA COLLECTION No.10 | 10 | 1000 | 300 | 30 | 5000 | 1200 |
| TOTAL SUM | 10 | 10000 | 3000 | 30 | 50000 | 12000 |

| DOMAIN #c | | | DOMAIN #d | | |
|---|---|---|---|---|---|
| CPU Busy | Memory Size | I/O Count | CPU Busy | Memory Size | I/O Count |
| 10 | 1000 | 100 | 10 | 1000 | 500 |
| 40 | 1000 | 100 | 10 | 1000 | 500 |
| ...... | ...... | ...... | ...... | ...... | ...... |
| 40 | 1000 | 100 | 10 | 1000 | 500 |
| 40 | 10000 | 1000 | 10 | 10000 | 5000 |

FIG. 11

MEMORY BUFFER ALLOCATION DEVICE AND COMPUTER READABLE MEDIUM HAVING STORED THEREON MEMORY BUFFER ALLOCATION PROGRAM

CROSS-REFERENCE TO RELATED APPLICATIONS

This application is based upon and claims the benefit of priority of the prior Japanese Patent Application No. 2008-089221, filed on Mar. 31, 2008, the entire contents which are incorporated herein by reference.

FIELD

The embodiment discussed herein relates to a technique for a virtual computer system. More particularly, the discussed embodiment relates to a memory buffer allocation device and program for dividing a memory buffer into areas, and allocating the divided area to each domain in a virtual computer system.

BACKGROUND

In the current server system, a processor attains higher performance, which can realize over 1000[MIPS] processing in many servers. A computer with such high performance processor has a memory buffer in order to compensate for a performance difference between the processor and the memory.

FIG. 12 illustrates a structure concept view for a processor and a memory. A memory buffer 200 is provided between a processor 100 and a memory storage 300, as illustrated in FIG. 12. The memory buffer 200 has a smaller capacity but a higher access speed than the memory storage 300. The memory buffer 200 is designed at multiple stages such as a first memory buffer 200a, a second memory buffer 200b and so.

To utilize the ability of the high performance processor as much as possible, many virtual computer systems (hereinafter, noted as VM system(s)) in which a plurality of guest operating systems (hereinafter noted as Oss) operate have been developed.

The VM system is a system in which one or more computers virtually operate on one real machine. One purpose of the VM system is to attain the higher use efficiency of a real processor by reducing an idle time in using the processor as much as possible.

In the VM system, execution of an instruction by a processor (virtual processor) operating in a virtual computer is carried out on the real processor to apparently perform an operation of the virtual processor in executing the instruction. In this case, the virtual processor uses the hardware of the computer in time-sharing mode.

One virtual execution environment, namely an environment under a virtual OS in the VM system is called a domain, and then an environment in which a plurality of different virtual OS'es may be independently operable is called a multi-domain environment.

As a literature document describing a technique for resource allocation to the virtual computer in the VM system, Japanese Patent Laid-Open No. 2007-200346 may be known, for example.

In Japanese Patent Laid-Open No. 2007-200346, the virtual computer system decides the allocation amount of logical partition and the allocation ratio between a main storage and an I/O in the shared allocation time, based on the CPU load of each OS. In addition, the memory buffer is not described in Japanese Patent Laid-Open No. 2007-200346.

In the VM system, every time when a different virtual OS is dispatched to the processor 100, a reference area thereof on the memory storage 300 is greatly changed, whereby a hit error of the memory buffer 200 may be more likely to occur. That is, the VM system is less efficient in view of the hit ratio of the memory buffer 200, whereby the memory buffer 200 may be cleared at every fixed time. Therefore, the job execution time of the processor 100 rather increases, which results in a problem that a high performance of the real processor cannot be utilized.

Usually, since a job under control of the real OS passes a control authority to the OS upon an I/O interrupt, the hardware resources are rarely used till the time allocated by time sharing.

On the contrary, each virtual OS in the VM system uses the hardware resources almost according to the time-sharing, unlike the job under control of the real OS. Therefore, conventionally, a state that "the hit ratio of the memory buffer 200 is low at the stage where the hardware resource is just allocated to the virtual OS but is stabilized in accordance with the passage of time" was repeated every time the control of the virtual OS transferred.

FIG. 13 illustrates an exemplary diagram for explaining the transition of a cache.

It is assumed that the processor 100 is allocated to a process for domain #a in the VM system 400 at a certain time. At this time, data of domain #a is stored in the memory buffer 200 during processing for domain #a.

It is assumed that after time t, the processor 100 is allocated to a process for domain #y. When data necessary for the process for domain #y does not exist in the memory buffer 200 during processing for domain #y, a cache error occurs, whereby it is required that necessary data is read from the memory storage 300.

It is assumed that at this time, data in domain #a is cleared by reading new data necessary for the process for domain #y into the memory buffer 200.

Next, when the processor 100 is allocated to the process for domain #a, data in domain #a used lastly at the previous time does not already exist in the memory buffer 200. Therefore, a cache error occurs again, and a process for re-reading necessary data occurs.

In this way, if the processor 100 is allocated to each domain of the VM system 400 in succession, a cache error frequently occurs. Thereby, there is a problem that the high performance of the processor 100 cannot be effectively utilized.

SUMMARY

According to an aspect of the discussed embodiment, a device divides the memory buffer into a certain number n of areas and reserves a division unit number m of areas out of the number n of the areas as a dedicated memory buffer and the other areas except for the number n of the areas as a shared memory buffer. Then the device allocates each area of the dedicated memory buffer to a number m of domains and each area of the shared memory buffer to other n-m domains except for the number m of domains, wherein the domains are of the virtual operating systems that are operating in the virtual computer system.

The object and advantage of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIGS. 10 and 11 illustrate a view for explaining a specific example of a memory buffer allocation process.

DESCRIPTION OF EMBODIMENT(S)

The disclosed device according to the invention aims to provide a memory buffer allocation process in which the hit ratio of a memory buffer can be increased in a virtual computer system having the memory buffer.

The embodiments of the above-mentioned device will be described below using the drawings.

Figure 1:
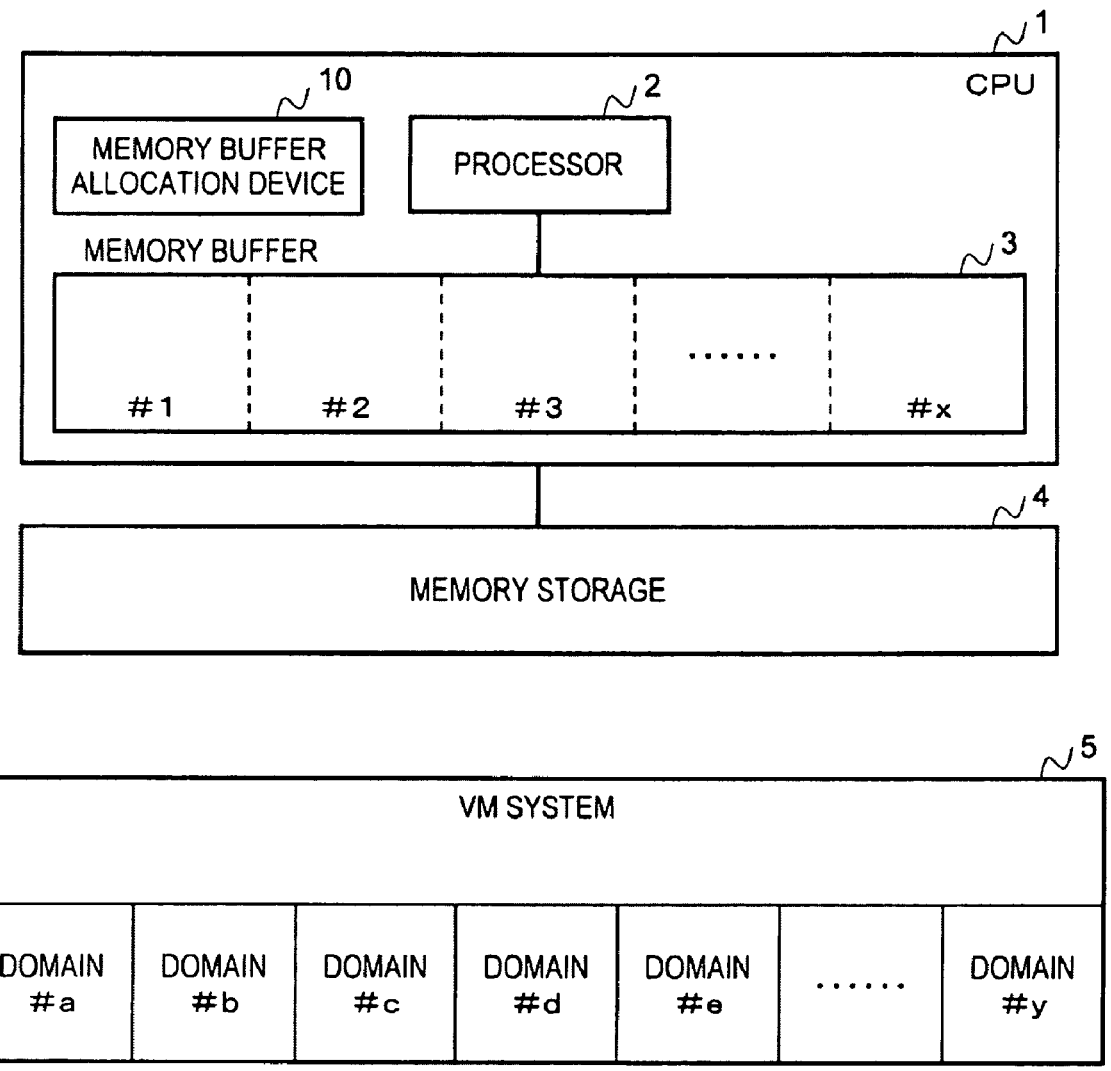
FIG. 1 is a view illustrating an example of an operation model according to an embodiment of the present invention.

FIG. 1 is a view illustrating an example of an operation model in a disclosed device according to an embodiment of the invention.

In the operation model as illustrated in FIG. 1, as the hardware configuration, a CPU 1 and a memory storage 4 are provided in a real computer for a VM system and the CPU 1 has a processor 2 and a memory buffer 3.

Each domain implemented in a VM system 5 operating on the real computer shares the hardware resources in time-sharing processing.

In the operation model as illustrated FIG. 1, while the memory buffer 3 recognizes the VM system 5, the VM system 5 can efficiently use the memory buffer 3. Therefore, in this embodiment, a memory buffer allocation device 10 divides the memory buffer 3 and allocates the domain with a higher CPU activity ratio to a specific divided memory buffer in order to improve the hit ratio of the memory buffer 3.

A relationship between the capacity and the hit ratio of the memory buffer 3 is similar to a saturation curve (Dose Resp), because the basic control of the memory buffer 3 is performed in an LRU logic. Therefore, the memory buffer allocation device 10 divides the memory buffer 3 as illustrated in FIG. 1 then preferentially assigns the divided memory buffer to the domain on the basis of height of CPU activity ratio, whereby the memory buffer allocation device 10 can prevent frequent variations of a reference area within the memory buffer 3 and improve the hit ratio of the memory buffer 3.

FIG. 2 is a view illustrating the examples of memory buffer allocation to each domain.

Herein, the memory buffer 3 is divided into four areas #1 to #4, of which three areas #1 to #3 are set as a dedicated memory buffer, and the area #4 is set as a shared memory buffer.

Each of the areas #1 to #3 in the dedicated memory buffer (hereinafter the dedicated memory buffers #1 to #3) is allocated to be used in one selected domain. In other domains that are not allocated to the dedicated memory buffer, the area #4 of the shared memory buffer (hereinafter a shared memory buffer #4) is used.

Also, the VM system 5 has six domains #a to #f to which the hardware resources are allocated successively in time-sharing processing.

In the case where a VM management device 20 for managing the VM system 5 measures the CPU activity ratio of each domain at every domain switching interval, the memory buffer allocation device 10 checks the allocation change of the dedicated memory buffer at the timing of switching the domains or once in plural times.

Figure 2A:
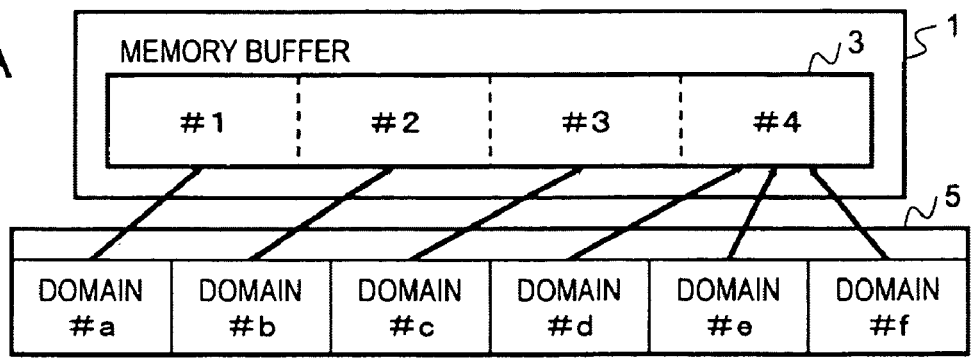
FIG. 2 is a view illustrating a view showing the examples of memory buffer allocation to each domain.

FIG. 2A is a view illustrating an example of memory buffer allocation in the case where the CPU activity ratio of each domain is in the order of "#a>#b>#c>#d>#e>#f".

In this case, the memory buffer allocation device 10 allocates three domains of domain #a, domain #b and domain #c in order from the highest CPU activity ratio to the dedicated memory buffers #1, #2 and #3. The remaining three domains of domain #d, domain #e and domain #f use one shared memory buffer #4.

Figure 2B:
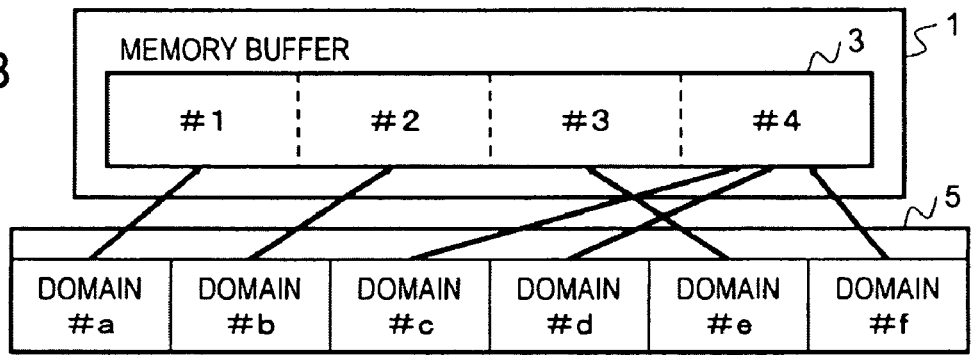

FIG. 2B is a view illustrating an exemplary situation in which the CPU activity ratio of domain #e increases after a certain time from the state described with FIG. 2A so that the CPU activity ratio of each domain is in the order of "#e>#a>#b>#c>#d>#f".

In this case, the memory buffer allocation device 10 allocates any one of the dedicated memory buffers to domain #e with higher CPU activity ratio.

Herein, the domain #e is allocated to the dedicated memory buffer #3 to which the domain #c is allocated, because the CPU activity ratio of the domain #c is the lowest among the domains allocated to the dedicated memory buffers. The domain #c, which is de-allocated from the dedicated memory buffer, thereafter uses the shared memory buffer #4.

Figure 2C:
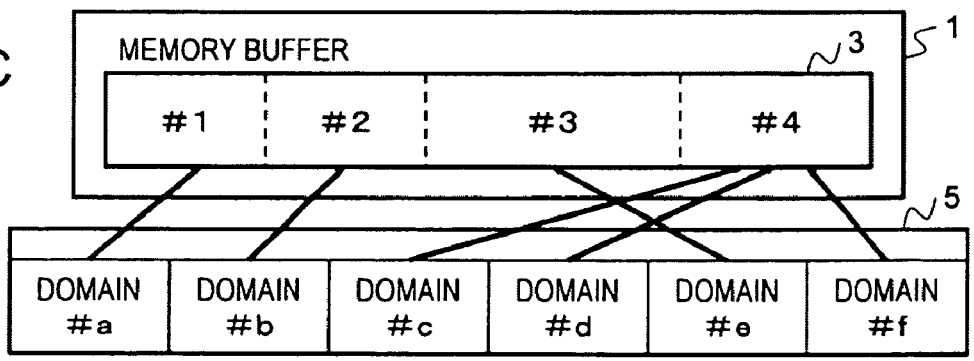

FIG. 2C is a view illustrating an exemplary situation in which the resource use amount of domain #e further increases from the state described with FIG. 2B. The memory buffer allocation device 10 performs, as resize of the dedicated memory buffer, increasing the size of the dedicated memory buffer allocated to the domain having a large amount of resource usage.

This resize of the dedicated memory buffer is determined and performed in accordance with a predetermined algorithm based on information of the amount of resource usage such as the amount of the real memory usage of each domain or information of the number of I/O issues that are measured by the VM management device 20 of the VM system 5 at the timing of every allocation change check for the dedicated memory buffer or once in plural times, for example.

In the example as illustrated in FIG. 2C, the resize is performed by increasing the size of the dedicated memory buffer #3 to which domain #e is allocated and accordingly decreasing the size of the dedicated memory buffers #1 and #2 to which the domains #a and #b are allocated.

Also, the memory buffer allocation device 10 preferentially allocates the dedicated memory buffer by designating a specific domain with an external input instruction, irrespective of the CPU activity ratio.

Some domains have possibility that the processing must not be delayed even with small CPU activity ratio. In such a case, the specific corresponding domain is designated with the external input instruction and the dedicated memory buffer is preferentially allocated to it.

Figure 2D:
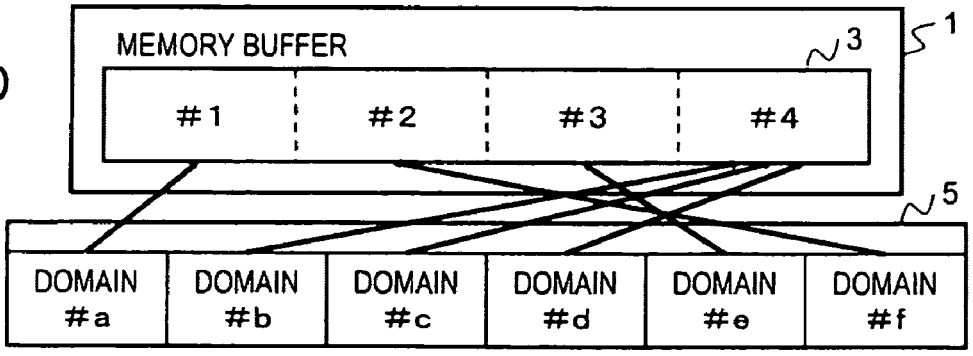

FIG. 2D is a view illustrating an allocation example in which the domain #f is designated as the above-mentioned specific domain which is to preferentially allocate the dedicated memory buffer in the state illustrated in FIG. 2B.

In this case, it is assumed that the CPU activity ratio of each domain is in the order of "#e>#a>#b>#c>#d>#f". Since the domain #f with the lowest CPU activity ratio is designated as the specific domain, it is required that the dedicated memory buffer is allocated to the domain #f. The domain #f is allocated to the dedicated memory buffer #2 to which the domain #b with the lowest CPU activity ratio is allocated among the domains to which the dedicated memory buffer is allocated by allocation change. The domain #b is de-allocated from the dedicated memory buffer thereafter uses the shared memory buffer #4.

The de-allocation of the specific domain can be made by an external input instruction in the same way as at the time of designation.

By dividing the memory buffer 3 and allocating the dedicated memory buffer as described in FIG. 2, the memory buffer allocation device 10 enables the virtual OS allocated to the dedicated memory buffer to keep a state where the hit ratio of memory is stable for the long time. Hence, the hit ratio of the memory buffer 3 can be improved as a whole.

Figure 3:
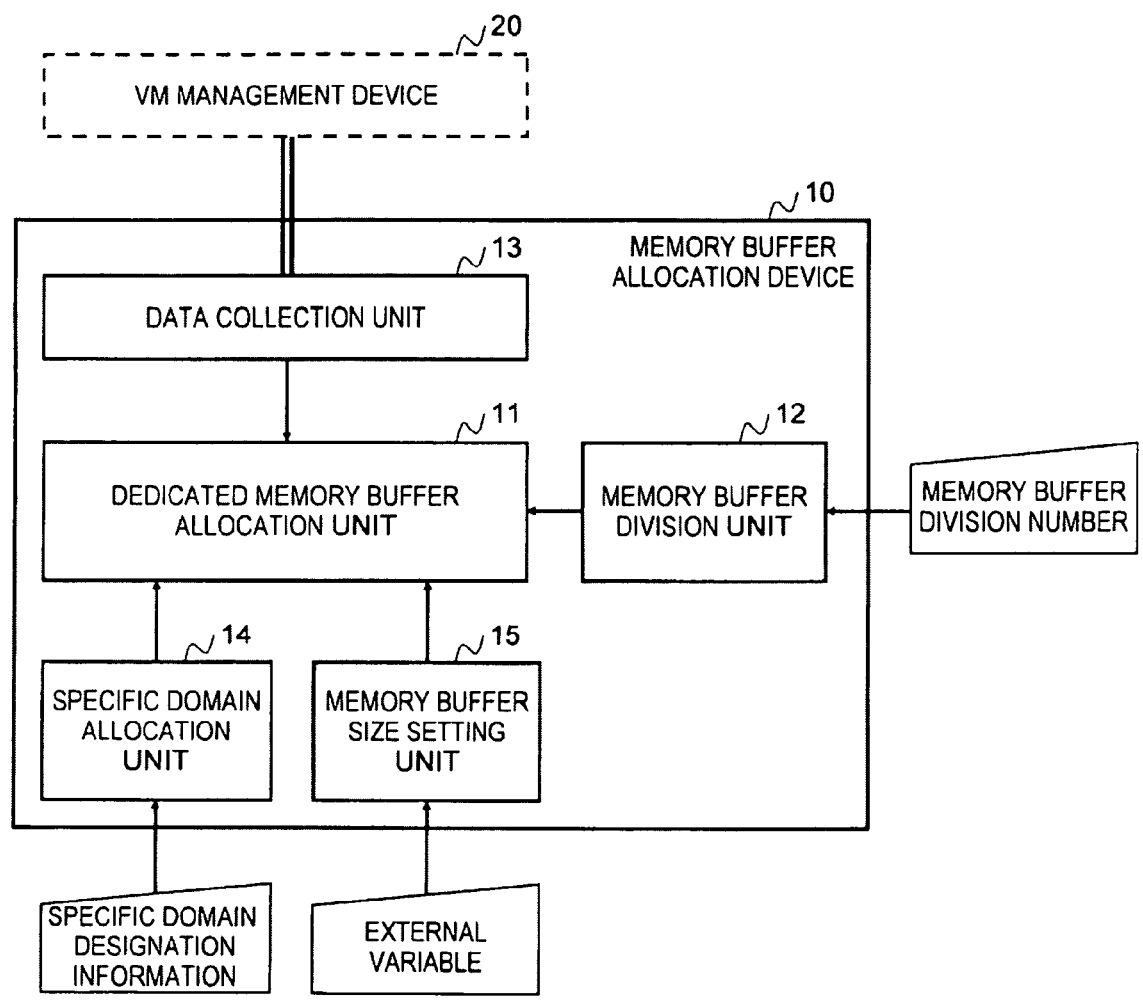
FIG. 3 is a diagram illustrating a configuration example of a memory buffer allocation device according to this embodiment.

FIG. 3 is a diagram illustrating an exemplary configuration of the memory buffer allocation device 10 according to this embodiment.

The memory buffer allocation device 10 comprises a dedicated memory buffer allocation unit 11, a memory buffer division unit 12, a data collection unit 13, a specific domain allocation unit 14 and a memory buffer size setting unit 15.

The dedicated memory buffer allocation unit 11 allocates the dedicated memory buffer of the memory buffer 3 as a central process of the memory buffer allocation process.

The memory buffer division unit 12 performs process of dividing the memory buffer 3 based on an external input instruction such as memory buffer division number, namely a division unit number and reserving some divided areas of the memory buffer 3 as a dedicated memory buffer and the other areas of the memory buffer 3 as a shared memory buffer.

The data collection unit 13 collects data, namely resource use situation data, such as the CPU activity ratio (for example, CPU utilization ratio) of each domain, the amount of real memory usage of each domain, and the number of I/O issues of each domain via an interface from the VM management device 20.

The specific domain allocation unit 14 allocates the dedicated memory buffer to the designated specific domain based on an external input instruction such as specific domain designation information.

The memory buffer size setting unit 15 determines the dedicated memory buffer to change the memory size or performs the memory resize, based on an external input instruction such as an external variable.

The memory buffer allocation device 10 manages and holds information on the allocation domain of each dedicated memory buffer, and information such as size of each dedicated memory buffer or shared memory buffer, though not illustrated in FIG. 3.

Figure 4:
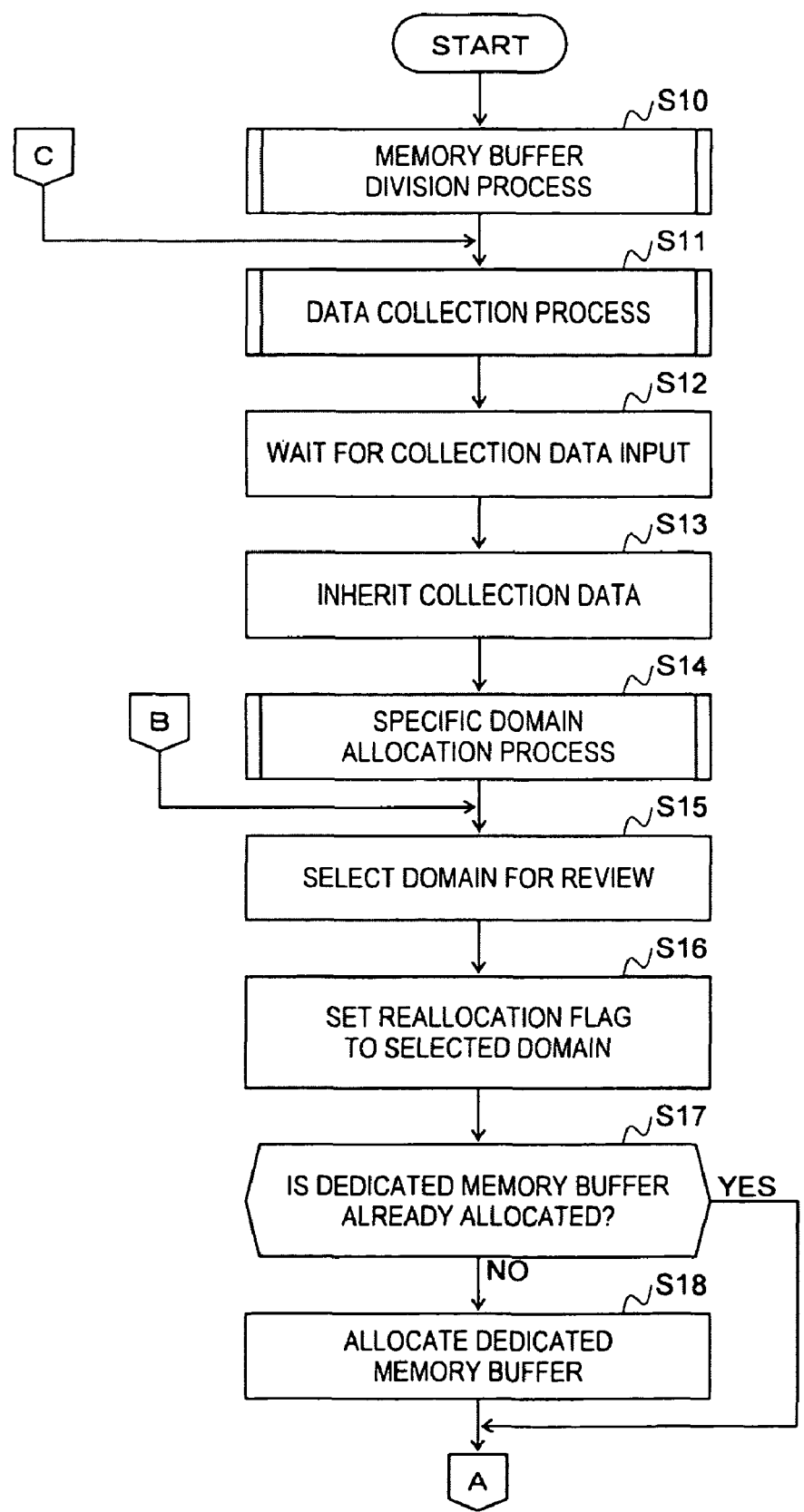
FIGS. 4 and 5 illustrate a memory buffer allocation processing flowchart according to this embodiment.
Figure 5:
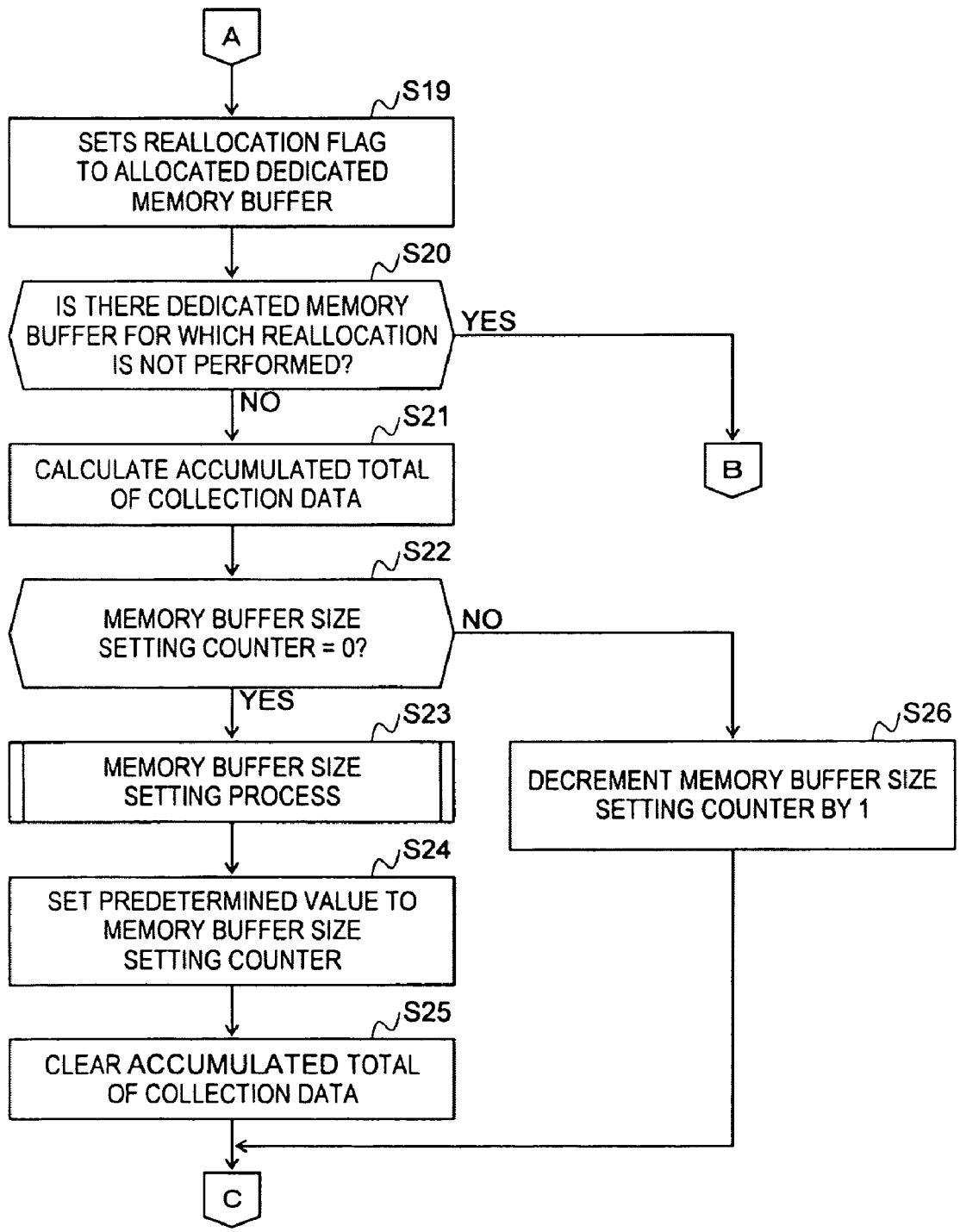

FIGS. 4 and 5 are a memory buffer allocation processing flowchart according to this embodiment.

A memory buffer allocation process as illustrated in FIGS. 4 and 5 is the process by the dedicated memory buffer allocation unit 11, and the central process of the memory buffer allocation process according to this embodiment.

The area of the memory buffer 3 is divided through a memory buffer division process by the memory buffer division unit 12 (step S10). Further, data is collected from the VM management device 20 through a data collection process by the data collection unit 13 (step S11).

The dedicated memory buffer allocation unit 11 waits for the input of collection data from the data collection unit 13 (step S12), and inherits collection data such as the CPU activity ratio of each domain, the amount of real memory usage and the number of I/O issues from the data collection unit 13 (step S13).

And the dedicated memory buffer is allocated to the domain designated by the external input instruction through a specific domain allocation process by the specific domain allocation unit 14 (step S14).

The dedicated memory buffer allocation unit 11 selects the domain with the highest CPU activity ratio among the domains for which the reallocation to the dedicated memory buffer is not performed as the domain to be reallocated to the dedicated memory buffer (step S15). The dedicated memory buffer allocation unit 11 sets a "reallocation flag" to the selected domain (step S16). The execution or non-execution of the reallocation to the dedicated memory buffer can be determined depending on whether the reallocation flag, which is prepared for each domain, is set or not. The reallocation flag is already set to the domain designated for the specific domain through the specific domain allocation process at step S14.

If the dedicated memory buffer is not yet allocated to the selected domain (NO at step S17), the dedicated memory buffer allocation unit 11 specifies the domain with the lowest CPU activity ratio among the domains to which the dedicated memory buffer is allocated and the reallocation is not practiced or the reallocation flag is not set. Then, the dedicated memory buffer allocation unit 11 allocates the dedicated memory buffer used by the specified domain to the selected domain (step S18).

The dedicated memory buffer allocation unit 11 sets the reallocation flag to the dedicated memory buffer to which the selected domain is allocated (step S19). For each dedicated memory buffer, like each domain, the reallocation flag is prepared. If the dedicated memory buffer for which the reallocation is not executed or the reallocation flag is not set still exists (YES at step S20), the operation returns to step S15.

The dedicated memory buffer allocation unit 11 calculates an accumulative total of the collection data such as the CPU activity ratio of each domain, the amount of the real memory usage of each domain, and the number of the I/O issues of each domain for each domain and each data (step S21). More specifically, a process for holding the accumulative data calculated at the previous time and adding the new collection data to the held accumulative data to hold the new total data is performed.

If a memory buffer size setting counter is 0 (YES at step S22), the memory buffer size setting process is performed by the memory buffer size setting unit 15 (step S23), performing the resizing of each dedicated memory buffer. Herein, the memory buffer size setting process is performed at a rate of once in a predetermined number of memory buffer reallocations, and the memory buffer size setting counter is the counter for counting a predetermined number of resizing interval.

If the memory buffer size setting process is performed, the dedicated memory buffer allocation unit 11 resets the memory buffer size setting counter (resizing interval) to a predetermined number (step S24). For example, if it is desired to perform the resizing of the dedicated memory buffer at every ten times of the dedicated memory buffer reallocation process, 10 is set to the memory buffer size setting counter. In addition, if the memory buffer size setting process is performed, the dedicated memory buffer allocation unit 11 clears the accumulated data for each domain and each data held for the next memory buffer size setting process (step S25).

If the memory buffer size setting counter is not 0 (NO at step S22), the memory buffer size setting process is not yet performed, whereby the dedicated memory buffer allocation unit 11 decrements the value of the memory buffer size setting counter by 1 (step S26).

Turning back to the processing at step S11, the dedicated memory buffer allocation unit 11 repeats the process for allocating the dedicated memory buffer to the specific domain, reallocating the dedicated memory buffer to the domain other than the specific domain, and resetting the memory buffer size from the next data collection. The reallocation flag of each dedicated memory buffer for each domain is cleared every time of returning to the processing at step S11.

Figure 6:
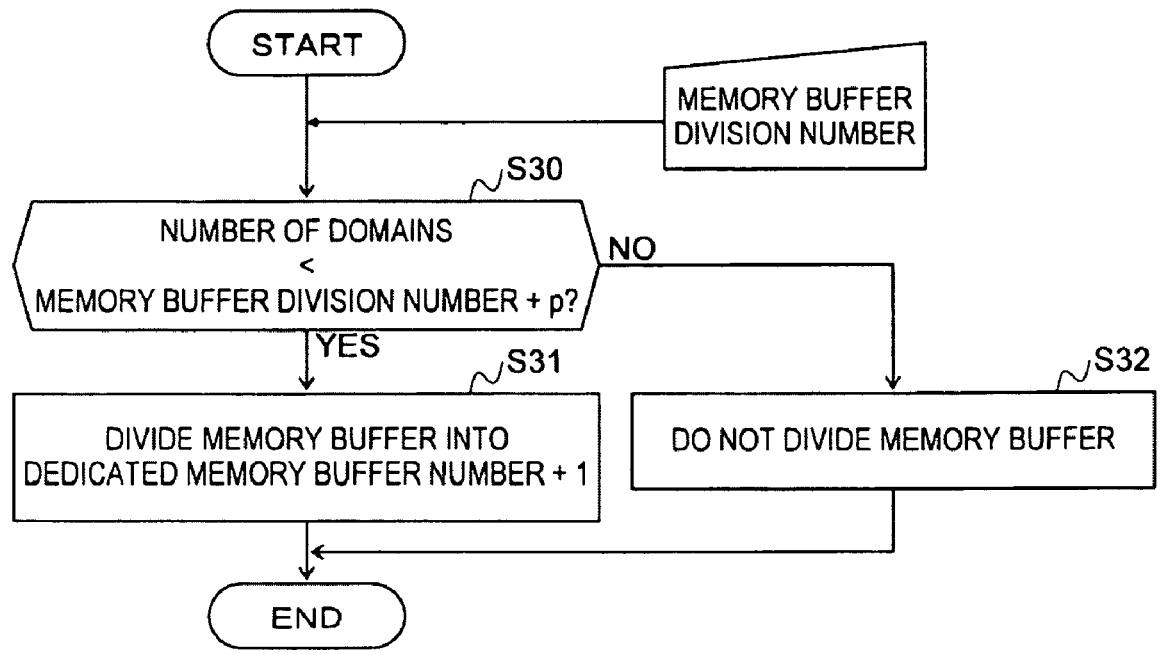
FIG. 6 illustrates a memory buffer division processing flowchart according to this embodiment.

FIG. 6 is an exemplary flowchart of memory buffer division processing according to this embodiment.

The memory buffer division process as illustrated in FIG. 6 is performed by the memory buffer division unit 12 and an initial process for the memory buffer allocation process according to this embodiment.

The memory buffer division number is inputted from the outside of the memory buffer allocation device 10. The external input instruction may be the dedicated memory buffer number, or both the memory buffer division number and the dedicated memory buffer number.

If the condition "the number of domains in the VM system<the memory buffer division number+constant p" is satisfied (YES at step S30), the memory buffer division unit 12 divides the area of the memory buffer 3 into the designated memory buffer division number (=the dedicated memory buffer number+1) (step S31).

The memory buffer division unit 12 sets the areas of the divided memory buffer to a predetermined dedicated memory buffer number and a shared memory buffer number, and holds the settings. Herein, though the shared memory buffer number is 1, the shared memory buffer number may be plural.

If the condition "the number of domains in the VM system 5<the memory buffer division number+constant p" is not satisfied (NO at step S30), the memory buffer division unit 12 does not divide the area of the memory buffer 3 (step S32).

Herein, the constant p is an integer value. If there are a great number of domains in the VM system 5, more domains use the shared memory buffer, giving rise to a problem that the performance of domain using the shared memory buffer is degraded. Thus, the number of domains in the VM system 5 in dividing the memory buffer 3 is limited to the memory buffer division number+p. Thereby, the degraded performance is prevented from being caused due to more domains using the shared memory buffer. For example, the value of p may be set at a preferable value of about 3 to 5.

Figure 7:
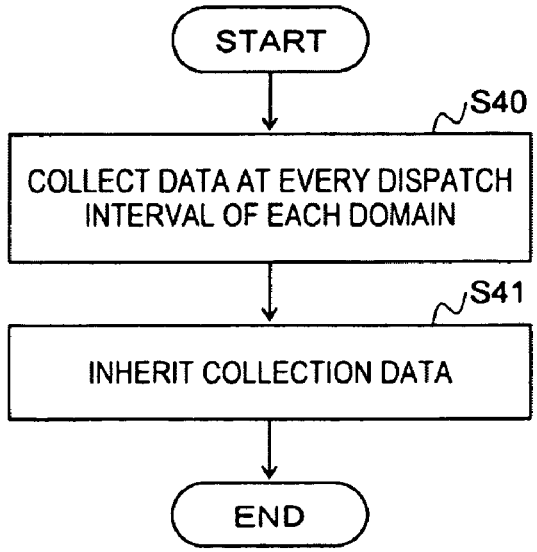
FIG. 7 illustrates data collection processing flowchart according to this embodiment.

FIG. 7 is an exemplary flowchart of data collection processing according to this embodiment. The data collection process as illustrated in FIG. 7 is performed by the data collection unit 13.

The data collection unit 13 collects data such as the CPU activity ratio of each domain, the amount of the real memory usage and the number of I/O issues from the VM management device 20 via the interface at every dispatch interval of each domain in the VM system 5 (step S40). The data collection unit 13 inherits the collected data to the dedicated memory buffer allocation process (step S41).

Figure 8:
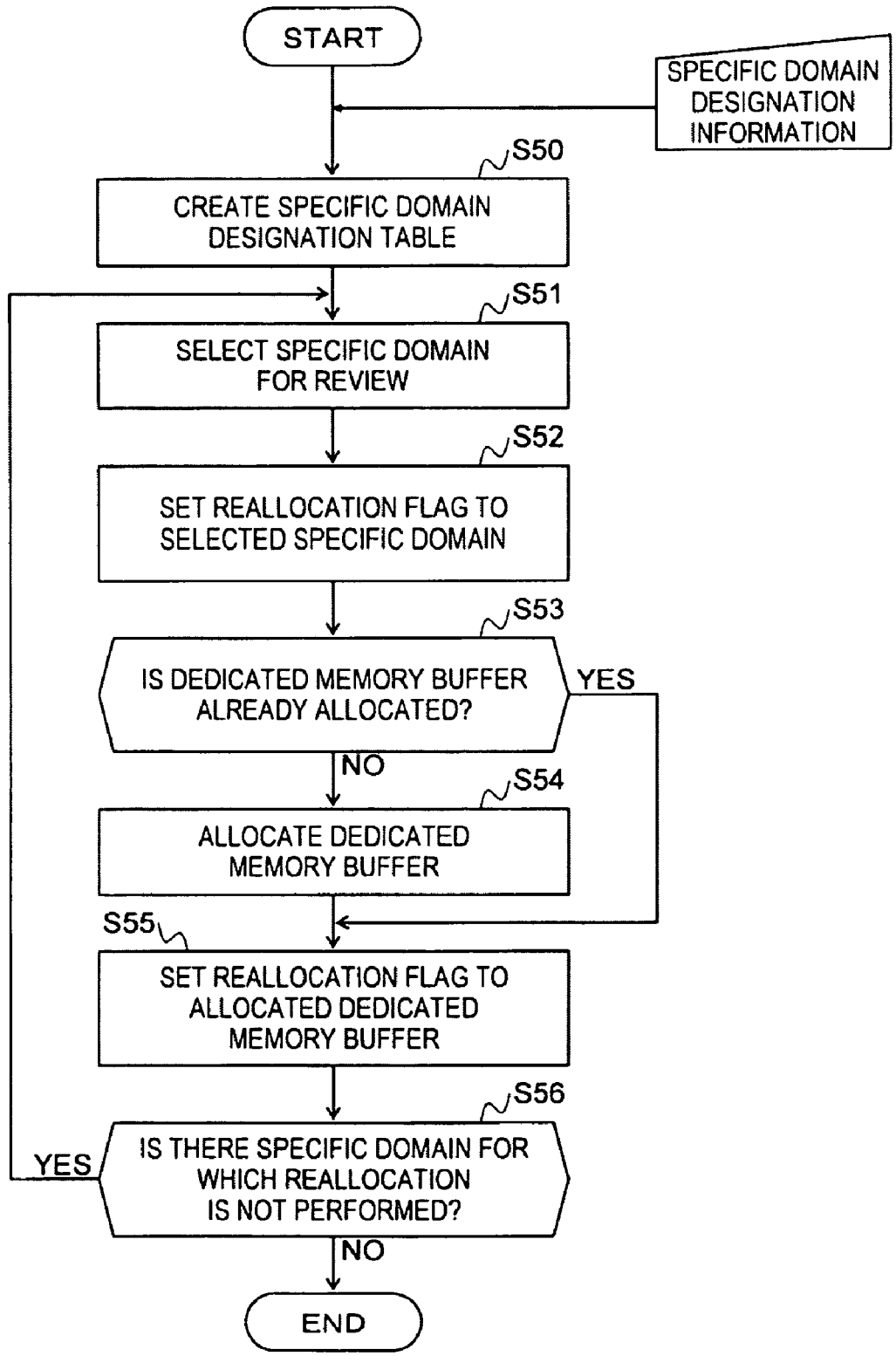
FIG. 8 illustrates a specific domain allocation processing flowchart according to this embodiment.

FIG. 8 is an exemplary flowchart of specific domain allocation processing according to this embodiment. The specific domain allocation process as illustrated in FIG. 8 is performed by the specific domain allocation unit 14.

The specific domain allocation unit 14 creates a specific domain designation table, which is list information of the designated specific domain, if the specific domain designation information that is designation information of the domain to allocate the dedicated memory buffer is inputted from the outside (step S50).

The specific domain allocation unit 14 selects the specific domain with the highest CPU activity ratio among the specific domains in which the reallocation to the dedicated memory buffer is not executed as the specific domain for performing the reallocation to the dedicated memory buffer from the specific domain designation table (step S51). The specific domain allocation unit 14 sets the reallocation flag to the selected specific domain (step S52).

If the dedicated memory buffer is not yet allocated to the selected specific domain (NO at step S53). The specific domain allocation unit 14 specifies the "domain in which the reallocation is not executed or the reallocation flag is not set and having the lowest CPU activity ratio" from among the domains to which the dedicated memory buffer is allocated, and allocates the dedicated memory buffer used by the domain to the selected specific domain (step S54).

The specific domain allocation unit 14 sets the reallocation flag to the dedicated memory buffer to which the selected specific domain is allocated (step S55).

And if the specific domain for which the reallocation is not executed or the reallocation flag is not set still exists in the specific domain designation table (YES at step S56), the operation returns to step S51.

Figure 9:
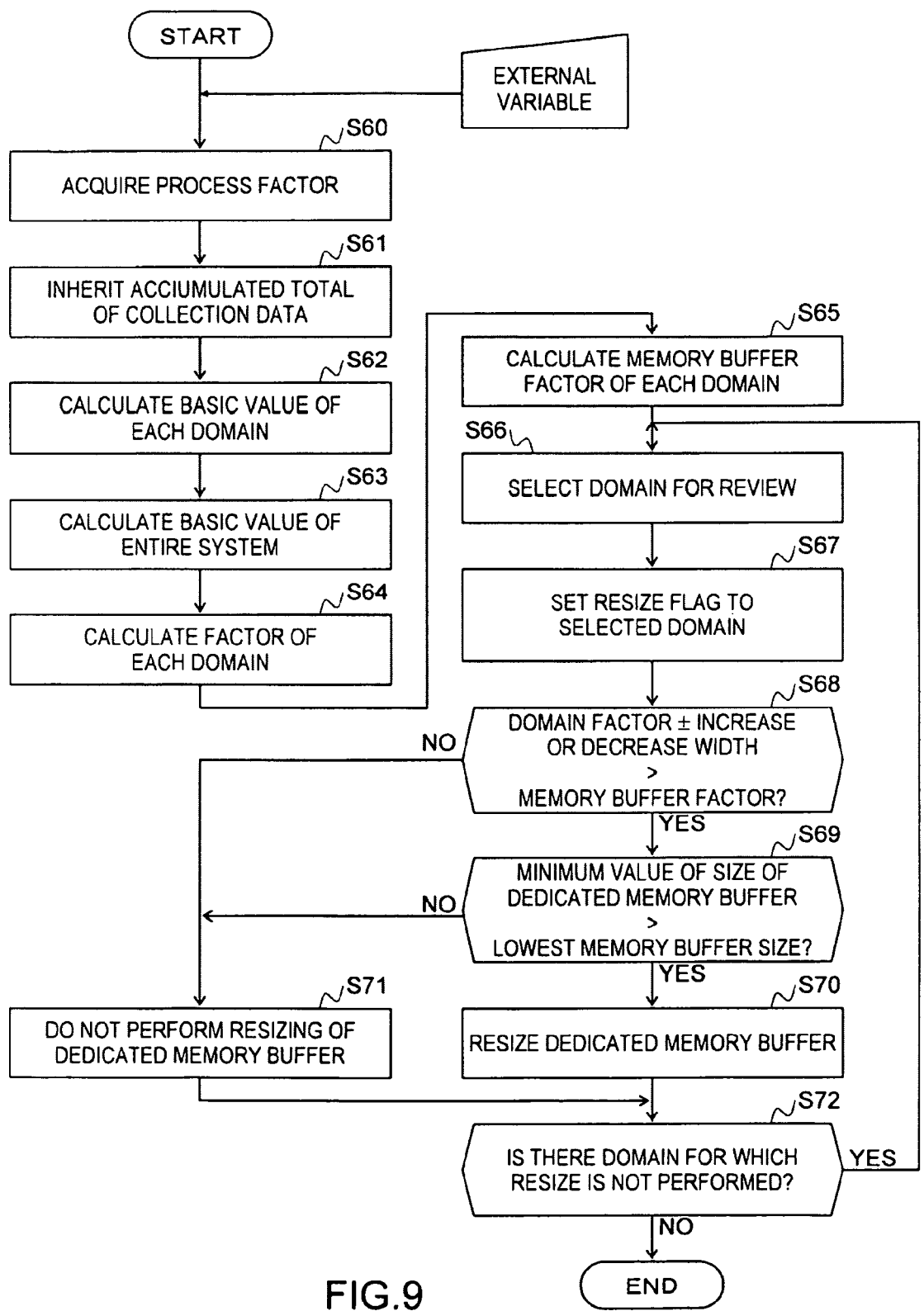
FIG. 9 illustrates a memory buffer size set-up processing flowchart according to this embodiment.
Figure 12:
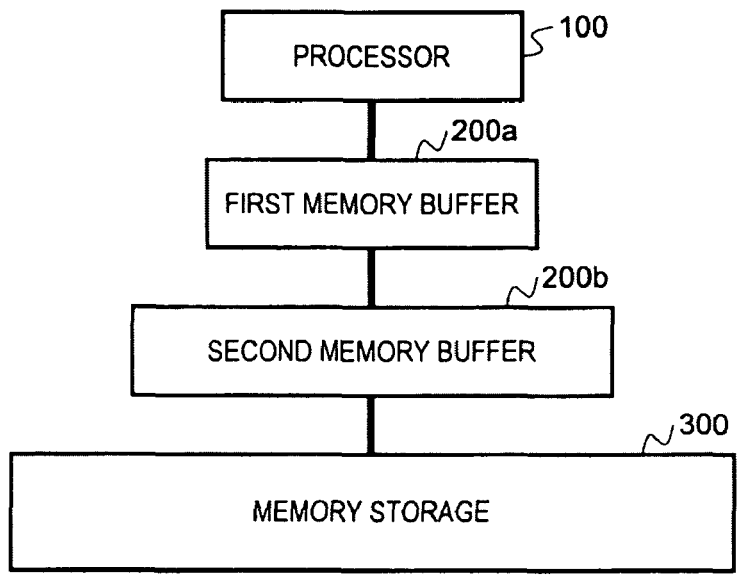
FIG. 12 illustrates a structure concept view of the processor and the memory.
Figure 13:
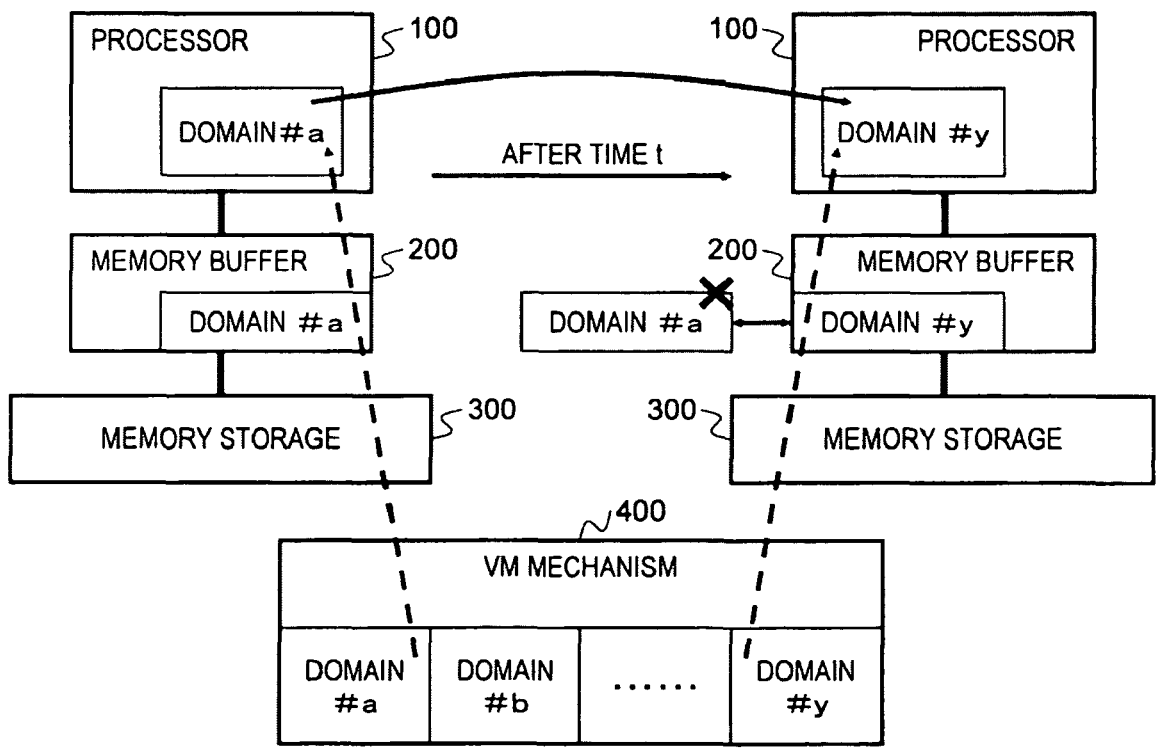
FIG. 13 illustrates an exemplary diagram for explaining the concept of cache transition.

FIG. 9 is an exemplary flowchart of memory buffer size setting processing according to this embodiment. The memory buffer size setting process as illustrated in FIG. 9 is performed by the memory buffer size setting unit 15.

The external variables such as a memory correction factor $\alpha$, an I/O correction factor $\beta$ and an increase or decrease width are inputted from the outside of the memory buffer allocation device 10. The variable values of the amount of resource usage such as the memory correction factor $\alpha$ and the I/O correction factor $\beta$ are changed by the amount of emphasized resource usage. The administrator of the VM system 5 can adjust the settings of the memory buffer size by changing these variable values.

The memory buffer size setting unit 15 reads processor factor $\gamma$ from an internal table of the VM management device 20 (step S60). Further, the memory buffer size setting unit 15 inherits from the dedicated memory buffer allocation process the total data for each domain and each data (step S61).

The memory buffer size setting unit 15 calculates the basic value of domain for each domain in accordance with the following formula (1) (step S62). In the following formula (1), the amount of real memory usage indicates the accumulated value of the amount of real memory usage for each domain inherited from the dedicated memory buffer allocation process. The number of I/O issues indicates the accumulated value of the number of I/O issues for each domain inherited from the dedicated memory buffer allocation process.

Basic value of domain=(amount of real memory usage×α+number of I/O issues×β)×γ  Formula (1):

Further, the memory buffer size setting unit 15 sums up the basic value of each domain, and calculates the basic value of the entire system (step S63). In addition, the memory buffer size setting unit 15 acquires the domain factor for each domain in accordance with the following formula (2) (step S64).

Domain factor=basic value of domain/basic value of entire system  Formula (2):

Next, the memory buffer size setting unit 15 acquires the memory buffer factor for each domain in accordance with the following formula (3) (step S65).

Memory buffer factor=dedicated memory buffer size/ total memory buffer size  Formula (3):

For the domain to which the dedicated memory buffer is not allocated, it is unnecessary to acquire the memory buffer factor.

The memory buffer size setting unit 15 selects the specific domain with the highest CPU activity ratio among the domains to which the dedicated memory buffer is allocated but for which the resize is not performed as the domain to resize the dedicated memory buffer (step S66). Moreover, the memory buffer size setting unit 15 sets the resize flag to the selected domain (step S67). The execution or non-execution of resizing the dedicated memory buffer can be determined depending on whether the resize flag prepared for each domain is set or not.

If the condition "domain factor±increase or decrease width>memory buffer factor" is satisfied for each selected domain (YES at step S68) and the condition "the minimum value of size of the dedicated memory buffer allocated to the domain for which the resizing is not performed>predetermined lowest memory buffer size" is satisfied (YES at step S69), the memory buffer size setting unit 15 performs the resizing of the dedicated memory buffer (step S70). The lowest memory buffer size is a threshold indicating the lowest limit of memory buffer size.

The resizing of the dedicated memory buffer is performed by reducing the size of the dedicated memory buffer allocated to the domain having the minimum memory buffer factor among the domains for which the resizing is not practiced by a predetermined unit size in the range not less than the lowest memory buffer size, and extending the size of the dedicated memory buffer allocated to the selected domain by the reduction amount, for example. The amount (size) of the unit for reduction or extension is preset.

The shared memory buffer may be the object of resize.

If the condition "domain factor±increase or decrease width>memory buffer factor" is not satisfied (NO at step S68) or the condition "the minimum value of size of the dedicated memory buffer allocated to the domain for which the resizing is not performed>predetermined lowest memory buffer size" is not satisfied (NO at step S69), the memory buffer size setting unit 15 does not perform the resizing of the dedicated memory buffer (step S71).

If the domain to which the dedicated memory buffer is allocated still but for which the resizing is not performed exists (YES at step S72), the operation returns to the processing at step S66. The resize flag of each domain is cleared every time the memory buffer size setting process is finished.

The above-described process of the memory buffer allocation device 10 can be realized by a computer and a software program implemented therein. The program may be recorded in a computer readable recording medium or distributed via a network transmission.

FIGS. 10 and 11 are views for explaining a specific example of the memory buffer allocation process. In the following, the specific example of the memory buffer allocation process will be described below using data as illustrated in FIGS. 10 and 11. FIG. 10A illustrates an exemplary structure of basic data. FIG. 10B illustrates an exemplary structure of external input data. FIG. 10C illustrates an exemplary state transition of the memory buffer 3. FIG. 11 illustrates the collection data and the accumulated total thereof.

It is assumed that the number of domains in the VM system 5 is four as illustrated in FIG. 10A. Those domains are designated as domain #a, domain #b, domain #c and domain #d.

Since the memory buffer division number is three as illustrated in FIG. 10B and the number of domains in the VM system 5 is four as illustrated in FIG. 10A, the condition of the memory buffer division is satisfied. The memory buffer 3 having the memory buffer size 12[MB] is divided into the dedicated memory buffer #1, the dedicated memory buffer #2 and the shared memory buffer, each of which is 4[MB].

At the starting point of this embodiment, the domain #a is allocated to the dedicated memory buffer #1 and the domain #b is allocated to the dedicated memory buffer #2, and the domain #c and domain #d use the shared memory buffer, as illustrated in FIG. 10C. It is assumed that at the starting point of this embodiment, the CPU activity ratio (corresponding to "CPU Busy" in FIG. 11) of domain #a is 40%, the CPU activity ratio of domain #b is 30%, the CPU activity ratio of domain #c is 10% and the CPU activity ratio of domain #d is 10%, as illustrated in FIG. 11. In addition, it is assumed that the value of the memory buffer size setting counter at the starting point is the set value as illustrated in FIG. 10A, namely, 10.

The interval of dispatching each domain is 10[ms], as illustrated in FIG. 10A. Herein, the data is collected at the timing of four dispatches of each domain.

After the starting point, in the first data collection, the CPU activity ratio of domain #a is 10%, the CPU activity ratio of domain #b is 30%, the CPU activity ratio of domain #c is 40%, and the CPU activity ratio of domain #d is 10%, as illustrated in data collection No. 1 of FIG. 11. At this time, the dedicated memory buffer is not allocated to domain #c with the maximum CPU activity ratio. Since the domain #a has the minimum CPU activity ratio among the domains to which the dedicated memory buffer is allocated, the dedicated memory buffer #1 allocated to domain #a is allocated to domain #c. The domain #a uses the shared memory buffer. The domain having the highest CPU activity ratio next to domain #c is domain #b to which the dedicated memory buffer #2 is allocated, whereby the allocation change is not performed anymore. The state of the memory buffer 3 is illustrated in data collection No. 1 of FIG. 10C.

Thereafter, the same data as data collection No. 1 is collected up to data collection No. 10, whereby the allocation change of the new dedicated memory buffer is not performed. At the stage of data collection No. 10, the memory buffer setting counter becomes zero (0), and the memory buffer size setting process is performed.

The accumulated total for each domain and each data at this point of time is illustrated in the total sum of FIG. 11. The processor factor is one (1) as illustrated in FIG. 10A, and the memory correction factor is 0.3, and the I/O correction factor is one (1), as illustrated in FIG. 10B. The basic value of each domain using the above formula (1) is calculated as domain #a: 6000, domain #b: 28000, domain #c: 4000 and domain #d: 8000, and the basic value of the entire system is calculated as 46000. In FIG. 11, Memory Size denotes the amount of real memory usage and I/O Count denotes the number of I/O issues.

The domain factor of each domain is calculated using the above formula (2) as domain #a: 0.13, domain #b: 0.60, domain #c: 0.9 and domain #d: 0.18. The memory buffer factor of domain #b and domain #c to which the dedicated memory buffer is allocated is calculated using the above formula (3) as domain #b: 0.33 and domain #c: 0.33.

The increase or decrease width is ±10[%] as illustrated in FIG. 10B and the lowest memory buffer size is 1[MB] as illustrated in FIG. 10A. Since 0.18±10[%]<0.33 for domain #c, it is determined that the resizing of the dedicated memory buffer is not performed. Since 0.60±10[%]>0.33 for domain #b, and the dedicated memory buffer size 4[MB] allocated to domain #c >minimum memory buffer size 1[MB], it is determined that the resizing of the dedicated memory buffer is performed. Herein, the size of the dedicated memory buffer #1 allocated to domain #c is reduced to 2[MB] and the size of the dedicated memory buffer #2 allocated to domain #b is extended to 6[MB], as illustrated in the memory buffer resize of FIG. 10C.

Though the embodiments of the invention have been described above, the invention is not limited to the above embodiments. For example, the memory buffer division number, the allocation number of dedicated memory buffer, the allocation number of shared memory buffer, and other values, which are set in FIG. 10A or FIG. 10B, may be appropriately changed.

For example, though the division/allocation of the first memory buffer has been basically described above in this embodiment, the division/allocation can be performed for the second memory buffer or the third memory buffer.

For example, when the division/allocation is performed for the second memory buffer or third memory buffer, it is considered that the size of about 4 to 8 times the first memory buffer is preferable as one unit. If the memory buffer is divided into a smaller size than this value, the hit ratio of the memory buffer is decreased in many cases, whereby there is high possibility of degrading the performance of the virtual computer system.

As disclosed above, the discussed memory buffer allocation device may acquire the CPU activity ratio of each domain at every predetermined interval, and reviews the domain to be allocated to the dedicated memory buffer.

Also, the discussed device may acquire the resource use situation data of each domain, and change the size of each divided memory buffer based on the acquired resource use situation data.

Also, the discussed device may designate a specific domain from the outside, and preferentially allocate the dedicated memory buffer to the designated specific domain.

In the discussed device, because the domain with the high CPU activity ratio has the high utilization factor of the memory buffer, it is possible to suppress variations of the reference area in the memory buffer and improve the hit ratio by allocating the dedicated memory buffer to such domain.

Also, the discussed device, wherein the data collection unit which can collect resource use situation data of each domain in the virtual computer system, may further comprises a memory buffer resize unit for changing the size of the divided area of the memory buffer based on the collected resource use situation data, for example, the amount of memory usage and the number of I/O issues.

Furthermore, in the memory buffer allocation device, the hit ratio of the memory buffer can be further improved by changing the size of the divided area of the memory buffer depending on the state of the allocated domain.

Also, in the memory buffer allocation device, the memory buffer allocation unit preferentially allocates a designated specific domain to the dedicated memory buffer.

In addition, when there is the domain for which the process must not be delayed even with the low CPU activity ratio, the dedicated memory buffer can be preferentially allocated to the domain.

That is, the hit ratio of the memory buffer can be improved by performing not only an LRU (Least Recently Used) logic that is the typical memory buffer control, but also a memory buffer control aware of the CPU activity ratio and the resource use situation of each domain in the virtual computer system.

For example, if the hit ratio of the memory buffer is increased 0.1%, the total efficiency of the computer is improved about 10% to 30%, because the performance of the memory is about 100 to 300 times slower than the processor.

If the hit ratio of the memory buffer is increased only 0.01%, the total efficiency of the computer is improved 1% to 3%, whereby the required number of CPUs can be reduced in a multiprocessor system over 100 CPUs.

All examples and conditional language recited herein are intended for pedagogical purposes to aid the reader in understanding the invention and the concepts contributed by the inventor to furthering the art, and to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A memory buffer allocation device for allocating a memory buffer provided on a CPU for a virtual computer system in which a plurality of virtual operating systems operate in time-sharing on the CPU, the device comprising:
    a memory buffer division unit which divides the memory buffer into a certain number (n) of areas, and reserves a certain number (m) of the areas as a dedicated memory buffer and a certain (n-m) of the areas as a shared memory buffer;
    a data collection unit which collects CPU activity ratio of each domain of the virtual operating systems in the virtual computer system; and
    a memory buffer allocation unit which identifies each domain of guest virtual operating systems that are operating in the virtual computer system, allocates each area of the dedicated memory buffer to a number m of domains in an order according to the CPU activity ratio and allocates each area of the shared memory buffer to other domains except for the number m of domains, in an order according to the CPU activity ratio.

2. The memory buffer allocation device according to claim 1, further comprising a memory buffer resize unit which changes the size of the divided area based on the resource use situation data, wherein the data collection unit collects resource use situation data of each domain of the virtual operating system in the virtual computer system.

3. The memory buffer allocation device according to claim 1, wherein the memory buffer allocation unit preferentially allocates a designated specific domain to the area reserved as the dedicated memory buffer.

4. A non-transitory computer readable medium having stored thereon a memory buffer allocation program that causes a computer to function as a memory buffer allocation device for allocating a memory buffer provided on a CPU for a virtual computer system in which a plurality of virtual operating systems operate in time-sharing on the CPU, the program comprising:

dividing the memory buffer into a certain number (n) of areas, and reserving a certain number (m) of the areas as a dedicated memory buffer and a certain (n-m) of the areas as a shared memory buffer;

collecting CPU activity ratio of each domain of the virtual operating systems in the virtual computer system;

identifying each domain of guest virtual operating systems that are operating in the virtual computer system;

allocating each area of the dedicated memory buffer to a number m of domains in an order according to the CPU activity ratio; and allocating each area of the shared memory buffer to other domains except for the number m of domains, in an order according to the CPU activity ratio.

5. The non-transitory computer readable medium according to claim 4, further comprising: changing the size of the divided area based on the resource use situation data, wherein the data collection unit collects resource use situation data of each domain of the virtual operating system in the virtual computer system.

6. The non-transitory computer readable medium according to claim 4, wherein the allocating preferentially allocates a designated specific domain to the dedicated memory buffer.

* * * * *